United States Patent
Witherbee

(10) Patent No.: US 9,791,073 B2
(45) Date of Patent: Oct. 17, 2017

(54) PIPE CLAMP

(71) Applicant: Cooper Technologies Company, Houston, TX (US)

(72) Inventor: Martin Lee Witherbee, Godfrey, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/970,147

(22) Filed: Dec. 15, 2015

(65) Prior Publication Data

US 2017/0167636 A1 Jun. 15, 2017

(51) Int. Cl.
| | | |
|---|---|---|
| *F16L 3/14* | (2006.01) | |
| *F16L 3/137* | (2006.01) | |
| *F16L 3/24* | (2006.01) | |
| *F16B 2/08* | (2006.01) | |
| *F16B 2/24* | (2006.01) | |
| *F16L 3/233* | (2006.01) | |

(52) U.S. Cl.
CPC ............. *F16L 3/137* (2013.01); *F16L 3/24* (2013.01); *F16B 2/08* (2013.01); *F16B 2/241* (2013.01); *F16L 3/14* (2013.01); *F16L 3/233* (2013.01)

(58) Field of Classification Search
USPC .......... 248/49, 58, 60, 62, 61, 63, 74.2, 74.3
See application file for complete search history.

(56) References Cited

U.S. PATENT DOCUMENTS

| | | | |
|---|---|---|---|
| 1,783,410 A | | 12/1930 | Cowell |
| 2,863,625 A | * | 12/1958 | Attwood ................... F16L 3/24 248/62 |
| 4,429,440 A | | 2/1984 | Laughlin et al. |
| 5,022,614 A | * | 6/1991 | Rinderer ................... F16L 3/24 248/62 |
| 5,593,115 A | | 1/1997 | Lewis |
| 6,161,804 A | * | 12/2000 | Paske ....................... F16L 3/12 248/71 |
| 6,224,025 B1 | | 5/2001 | Alvarez |
| 6,257,530 B1 | * | 7/2001 | Tsai ....................... F16L 3/127 248/73 |

(Continued)

OTHER PUBLICATIONS

Corrosionist: All you need to know on Corrosion & Rust, http://www.corrosionist.com/Galyanic_Corrosion.htm; Mar. 3, 2015, 7 pages.

(Continued)

*Primary Examiner* — Alfred Wujciak
(74) *Attorney, Agent, or Firm* — Senniger Powers LLP

(57) ABSTRACT

A pipe clamp for mounting a pipe on a stud mounting bracket includes a main body having a central pipe engaging portion and opposed first and second transition portions. The main body has a horizontal axis extending through a center of the main body and a vertical axis extending through the center of the main body. The first and second transition portions are positioned on opposed sides of the horizontal axis and on opposed sides of the vertical axis. First and second arms extend from the respective transition portions in a direction away from the vertical axis. First and second fingers extend from the respective arms in a direction toward the horizontal axis. First and second hooks extend from the respective fingers in a direction toward the vertical axis.

9 Claims, 18 Drawing Sheets

(56) References Cited

U.S. PATENT DOCUMENTS 6,341,626 B1    1/2002  Davenport et al.
6,354,543 B1 *  3/2002  Paske ........................ H01P 1/00
                                                    211/85.18

OTHER PUBLICATIONS

Adjustable Sliding Guide Installation Instructions, http://www.corrosionist.com/Galvanic_Corrosion.htm; Oct. 2011, 5 pages.

* cited by examiner

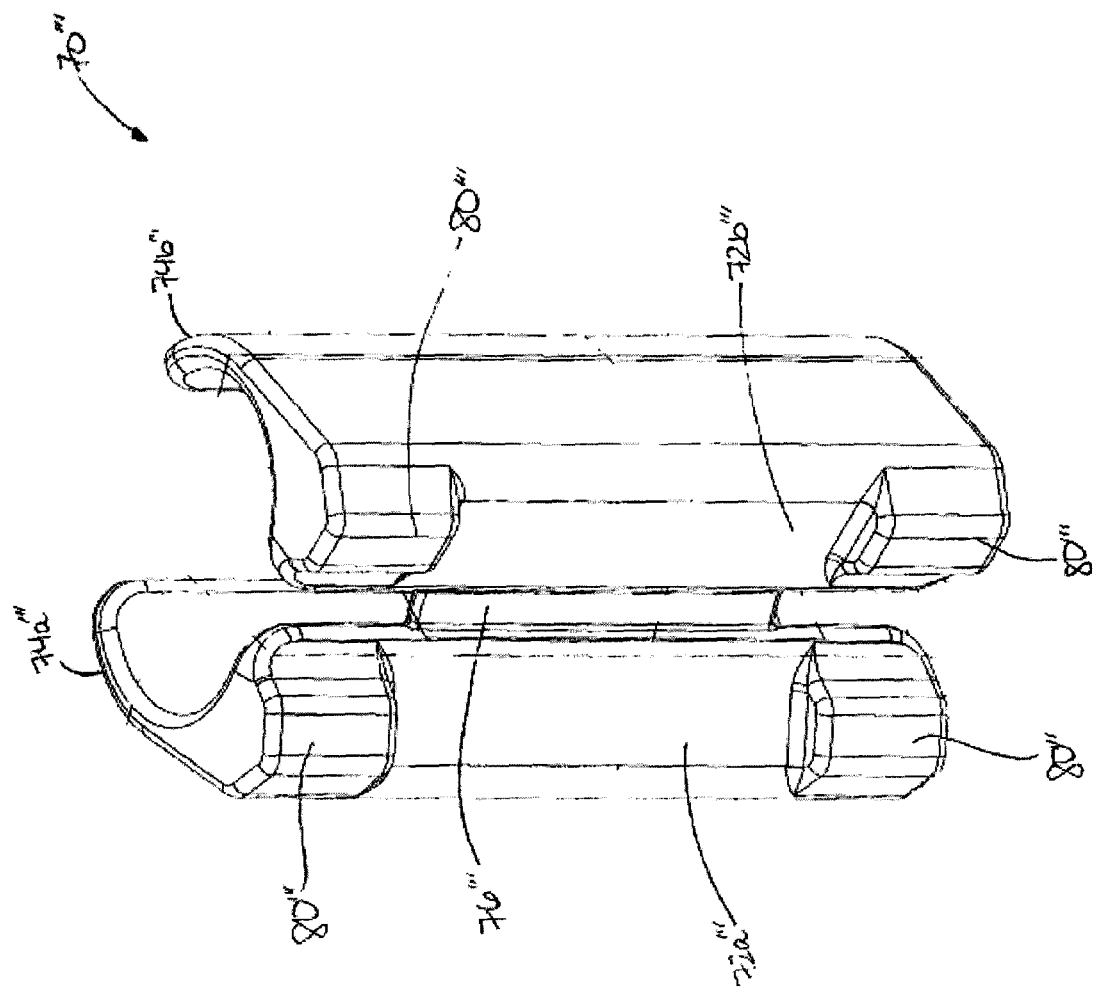

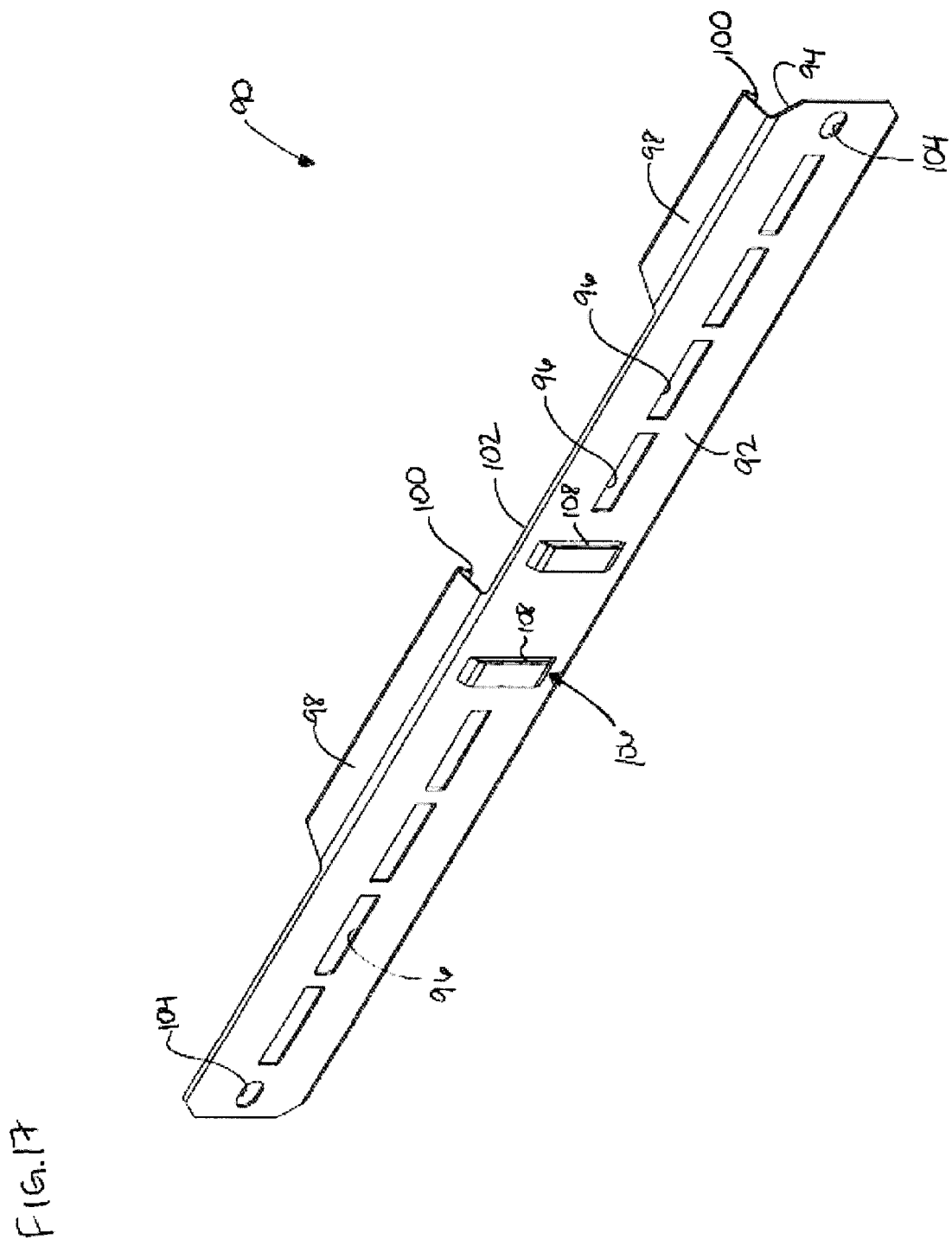

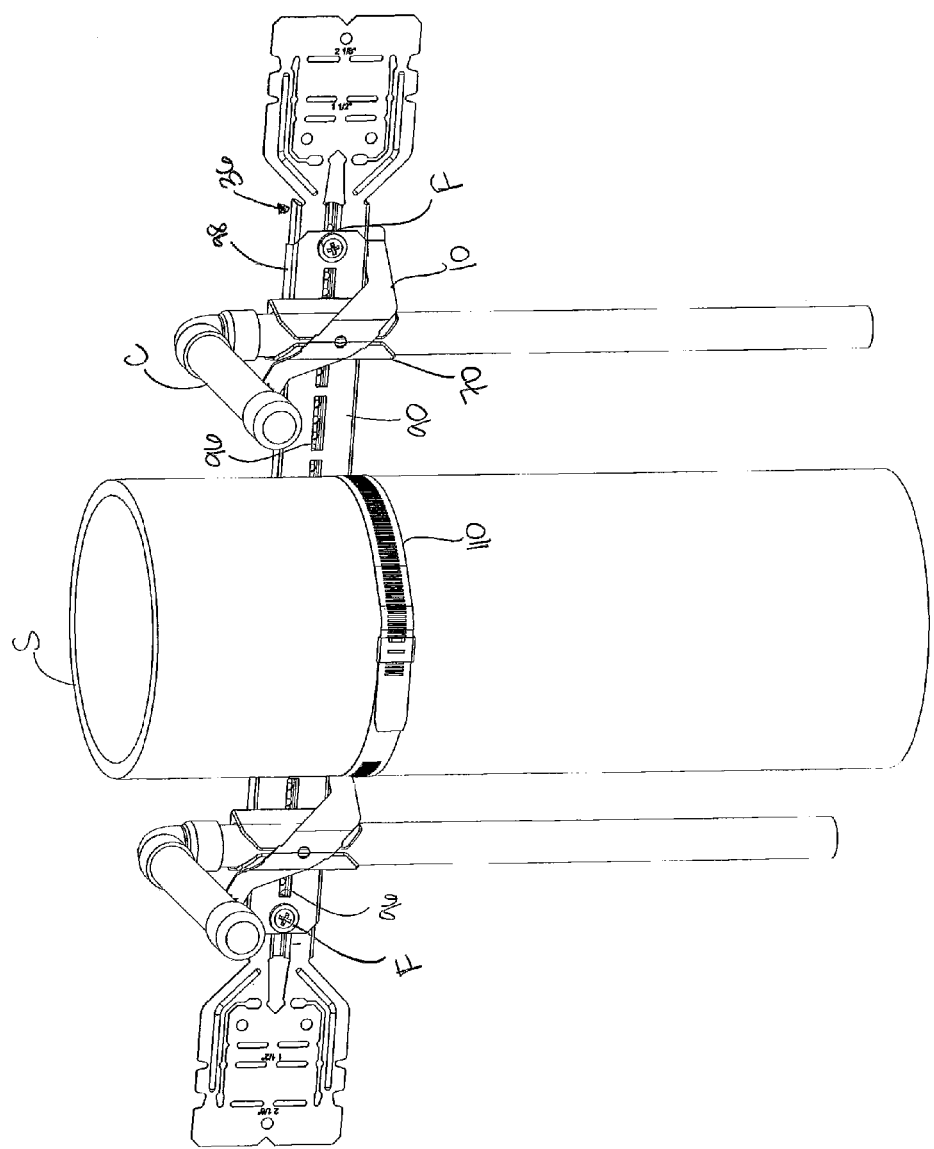

PIPE CLAMP

FIELD OF THE DISCLOSURE

The present disclosure generally relates to a clamp for mounting pipe on a stud-to-stud mounting bracket between wall studs.

BACKGROUND OF THE DISCLOSURE

Typically, pipes (e.g., conduit, tubing) are attached to stud mounting brackets using pipe clamps that require fasteners and tools to position and attach. The number of pipes that can be secured to a bracket is limited by the amount of space each pipe clamp occupies. In addition, locating the pipe and/or the pipe clamp on the bracket can pose some difficulties.

SUMMARY OF THE DISCLOSURE

In one aspect, a pipe clamp for mounting a pipe on a stud mounting bracket includes a main body having a central pipe engaging portion and opposed first and second transition portions. The main body has a horizontal axis extending through a center of the main body and a vertical axis extending through the center of the main body. The first and second transition portions are positioned on opposed sides of the horizontal axis and on opposed sides of the vertical axis. A first arm extends from the first transition portion in a direction away from the vertical axis, and a second arm extends from the second transition portion in a direction away from the vertical axis. A first finger extends from the first arm in a direction toward the horizontal axis, and a second finger extends from the second arm in a direction toward the horizontal axis. A first hook extends from the first finger in a direction toward the vertical axis, and a second hook extending from the second finger in a direction toward the vertical axis.

In another aspect, a pipe sleeve for isolating a pipe from a stud mounting bracket and from a pipe clamp securing the pipe to the stud mounting bracket includes a bracket engaging portion configured to engage a front face of a stud mounting bracket. A pipe engaging portion is configured to engage a pipe, wherein upon securing the pipe to the stud mounting bracket with a pipe clamp the bracket engaging portion is positioned between the pipe and the stud mounting bracket and the pipe engaging portion is positioned between the pipe and the pipe clamp.

In another aspect, a stud mounting bracket assembly includes a stud mounting bracket having a front face and a rear face and a pipe clamp configured to engage the rear face of the stud mounting bracket to secure a pipe to the front face of the stud mounting bracket.

Other features will be in part apparent and in part pointed out hereinafter.

BRIEF DESCRIPTION OF THE DRAWINGS

FIG. 16 is a perspective of an another embodiment of a pipe sleeve for isolating a pipe from the pipe clamp and the stud mounting bracket;

FIG. 17 is a perspective of a locator bracket for use in a prefabricated assembly including the pipe clamp; and FIG. 18 is a perspective of a stud mounting bracket assembly including the locator bracket, the stud mounting bracket, pipes, pipe clamps, and pipe sleeves.

Corresponding reference characters indicate corresponding parts throughout the drawings.

DETAILED DESCRIPTION

Figure 1:
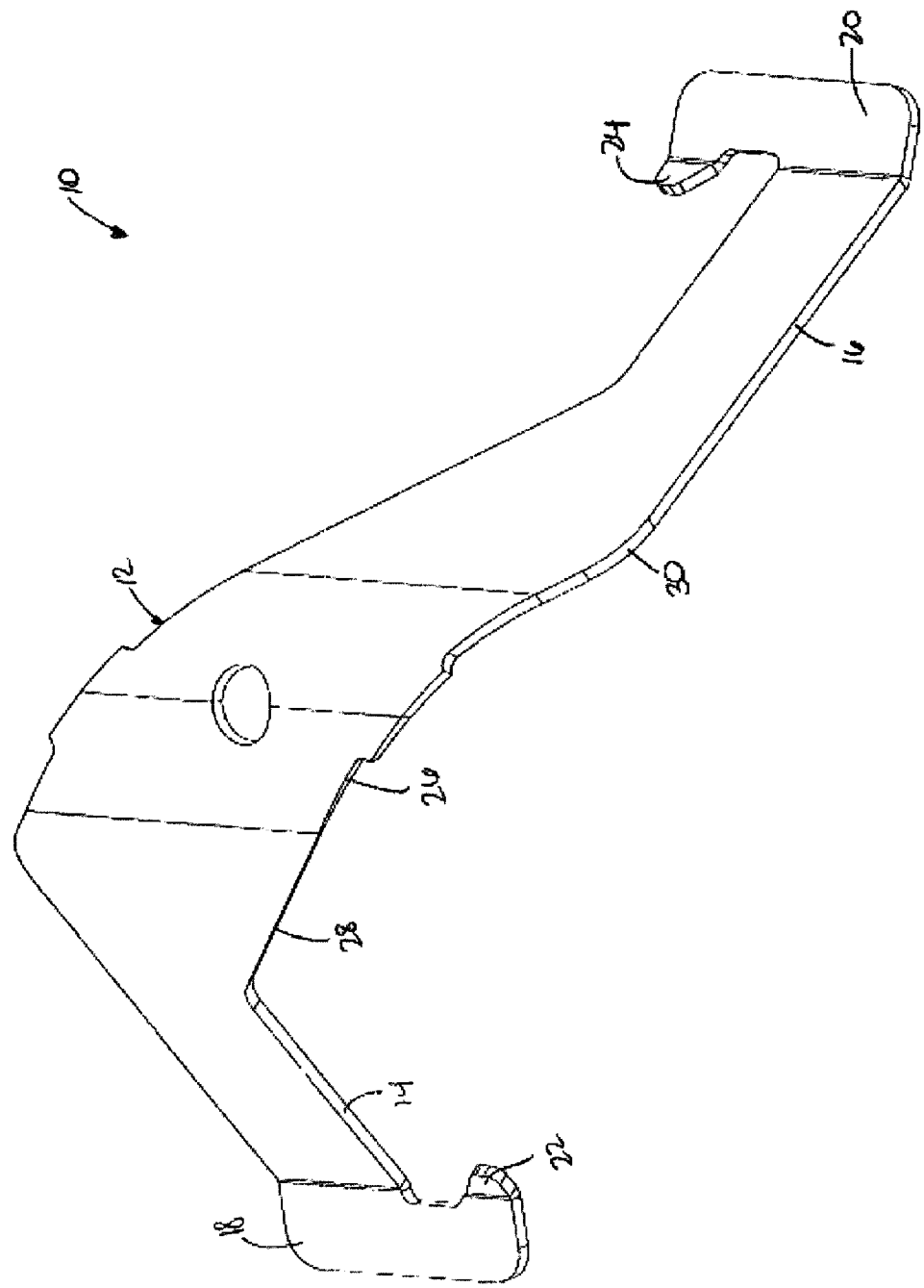
FIG. 1 is a perspective of a pipe clamp for use in mounting pipe to a stud mounting bracket.

Referring to FIGS. 1-6, a pipe clamp for mounting a pipe (e.g., conduit, tubing) to a stud-to-stud mounting bracket (broadly, a stud mounting bracket) is generally indicated at 10. The pipe clamp (or pipe clamp) 10 is configured for use with a stud mounting bracket (e.g., a telescoping bracket) to mount a pipe to a front face of the stud mounting bracket, as described in detail below. The orientation of the pipe clamp 10 in the drawings provides the point of reference for the terms defining relative locations and positions of structures and components of the bracket, including but not limited to the terms "upper," "lower," "left," "right," "top," "bottom," "forward," and "rearward," as used throughout the present disclosure. It is understood that the relative locations and positions are used for convenience in describing embodiments of the inventions and are not used in a limiting sense.

The pipe clamp 10 includes a main body, generally indicated at 12, and a pair of opposing arms 14, 16. Each of the arms 14, 16 extends from the main body 12 at an angle. Each of the arms 14, 16 includes a flange or finger 18, 20 extending from a terminal end thereof, and a hook 22, 24 extending from a terminal end of the finger configured to engage a stud mounting bracket. In the illustrated embodiment, the pipe clamp 10 is formed as a unitary structure. The pipe clamp 10 may be formed from a single sheet of metal (e.g., steel or aluminum), or other suitable material. In one embodiment, the pipe clamp 10 is formed from spring steel.

Figure 2:
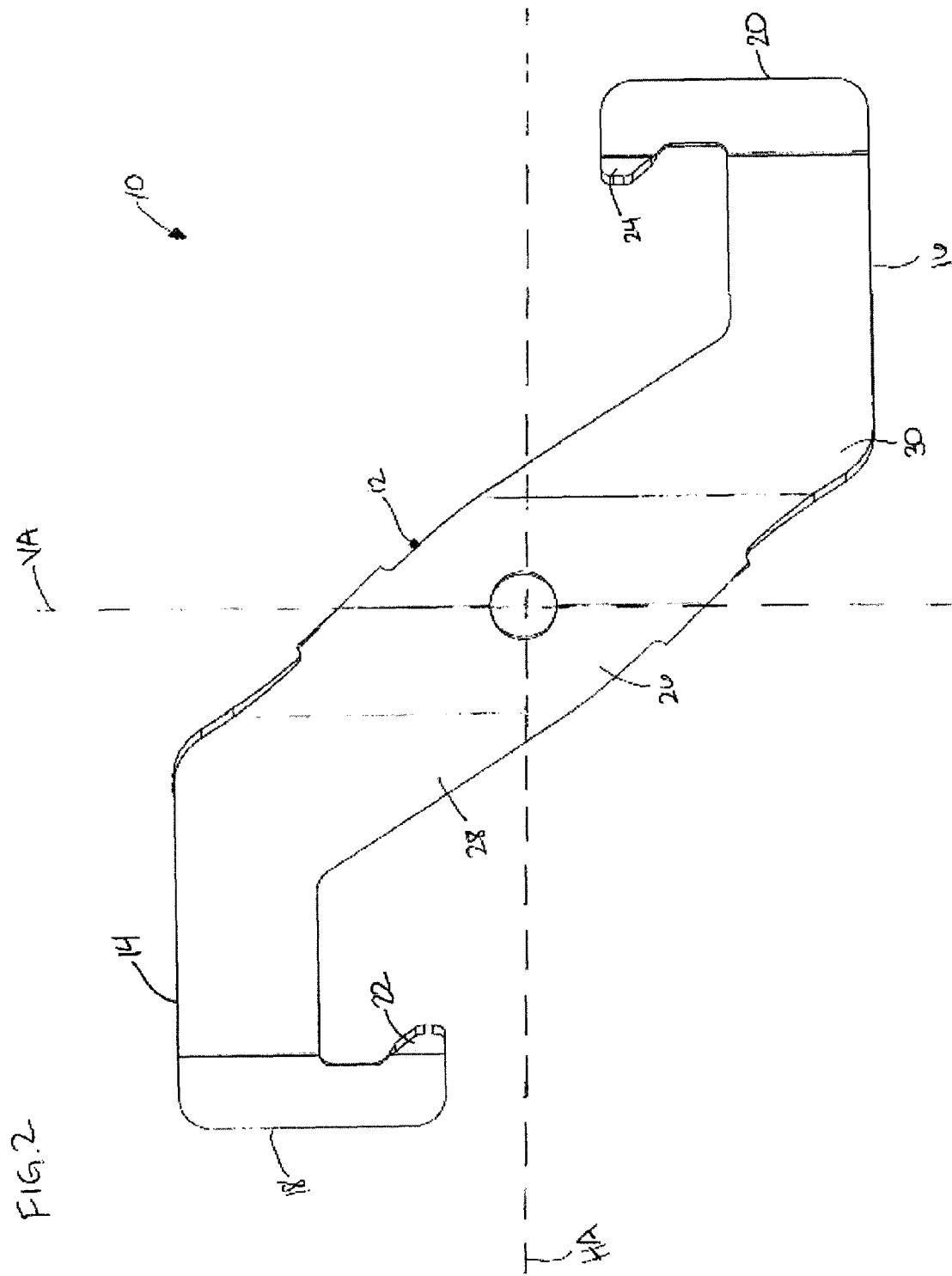
FIG. 2 is a top plan of the pipe clamp of FIG. 1.
Figure 3:
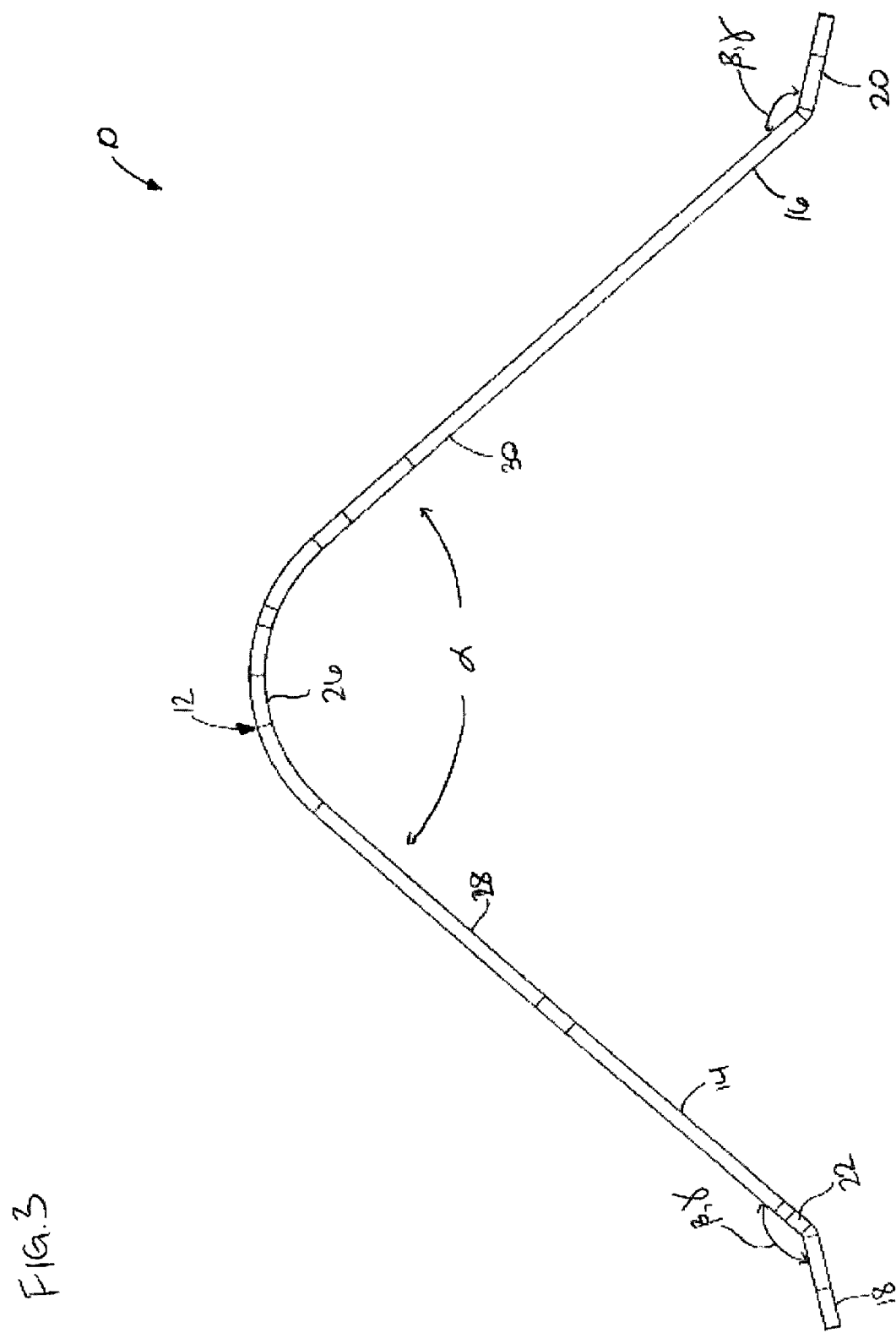
FIG. 3 is a front elevation of the pipe clamp of FIG. 1.

Referring to FIG. 2, a horizontal axis HA extends through the center of the main body 12. A vertical axis VA extends through the center of the main body 12. As seen in FIG. 3, the main body 12 includes a central pipe engaging portion 26 and transition portions 28, 30. As illustrated, the pipe engaging portion 26 is arcuate to generally conform to a circumferential portion of a pipe P secured by the pipe clamp 10. The center of the main body 12 is located in the central pipe engaging portion 26. As seen in FIGS. 2 and 3, the pipe engaging portion 26 extends at an angle to the horizontal axis HA and at an angle to the vertical axis VA. As seen in FIG. 2, the pipe engaging portion 26 extends from a position above the axis HA and to the left of the axis VA to a position below the axis HA and to the right of the axis VA. The pipe engaging portion 26 is the forward-most portion of the pipe clamp 10. The remainder of the pipe clamp 10 is positioned rearward of the central engaging portion 26.

Transition portions 28, 30 extend from each end of the central pipe engaging portion 26. The transition portions 28, 30 are generally planar. The transition portions 28, 30 extend between the pipe engaging portion 26 and the respective arms 14, 16. As seen in FIGS. 2 and 3, each of the transition portions 28, 30 extends at an angle to the horizontal axis HA and at an angle to the vertical axis VA. As seen in FIG. 2, the first transition portion 28 is positioned substantially above the horizontal axis HA and to the left of the vertical axis VA. The second transition portion 30 is positioned substantially below the horizontal axis HA and to the right of the vertical axis VA. As seen in FIG. 3, the transition portions 28, 30 are angled relative to each other. An angle $\alpha$ between the transition portions 28, 30 can be in a range of about 90° to about 180° (i.e., the transition portions can be coplanar). In one embodiment, the angle $\alpha$ between the transition portions 28, 30 is approximately about 110°. The angle $\alpha$ is sufficient such that when the pipe clamp 10 is installed, the pipe clamp applies compression on the pipe P between the pipe engaging portion 26 and a face of the stud mounting bracket. When the pipe clamp 10 is installed, the angle $\alpha$ is reduced to apply tension on the pipe P. This spring tension helps retain the pipe P on the bracket. For example, when the pipe clamp 10 is installed, the angle $\alpha$ may be reduced by a range of about 10° to about 40°. It is understood that the angle $\alpha$, installed or uninstalled, can vary based on the pipe clamp material and thickness, the dimensions of the pipe P, or other factors. Other configurations are within the scope of the present invention.

An arm 14, 16 extends from each of the transition portions 28, 30. The arms 14, 16 are generally planar. Each arm 14, 16 is generally co-planar with the respective transition portion 28, 30. Each arm 14, 16 extends generally parallel to the horizontal axis HA and generally perpendicular to the vertical axis VA. As seen in FIG. 2, each arm 14, 16 extends from the respective transition portion 28, 30 in a direction away from the vertical axis VA. The first arm 14 is positioned above the horizontal axis HA and to the left of the vertical axis VA. The second arm 16 is positioned below the horizontal axis HA and to the right of the vertical axis VA.

The fingers 18, 20 extend from the arms 14, 16, respectively. The fingers 18, 20 are generally planar. Each finger 18, 20 extends at an angle to the respective arm 14, 16. It is understood that other configurations are within the scope of the present invention, such as the fingers 18, 20 being planar to the respective arms 14, 16. In the illustrated embodiment, the fingers 18, 20 extend from the respective arms 14, 16 at an angle $\beta$. The angle $\beta$ can be in a range of about 90° to about 180°. As seen in FIG. 3, the angle $\beta$ between the arm 14 and the finger 18 is approximately about 145°. Similarly, the finger 20 extends from the arm 16 at an angle of about 145°. The fingers 18, 20 may be generally parallel to each other. As seen in FIG. 2, the fingers 18, 20 are generally parallel to the vertical axis VA and generally perpendicular to the horizontal axis HA. The first finger 18 is positioned above the horizontal axis HA and to the left of the vertical axis VA. The second finger 20 is positioned below the horizontal axis HA and to the right of the vertical axis VA. Each finger 18, 20 extends from the respective arm 14, 16 in a direction toward the horizontal axis HA. In other words, the fingers 18, 20 are closer to the horizontal axis HA than the arms 14, 16.

The hooks 22, 24 extend from the fingers 18, 20, respectively. Each hook 22, 24 extends at an angle to the respective finger 18, 20. It is understood that other configurations are within the scope of the present invention, such as the hooks 22, 24 being planar to the respective fingers 18, 20. In the illustrated embodiment, the hooks 22, 24 extend from the respective fingers 18, 20 at an angle $\gamma$. The angle $\gamma$ can be in a range of about 90° to about 180°. As seen in FIG. 3, the angle $\gamma$ between the finger 18 and the hook 22 is approximately about 145°. Similarly, the hook 24 extends from the finger 20 at an angle of about 145°. In one embodiment, the hooks 22, 24 are generally co-planar with the respective arms 14, 16. The first hook 22 is positioned above the horizontal axis HA and to the left of the vertical axis VA. The second hook 24 is positioned below the horizontal axis HA and to the right of the vertical axis VA. Each hook 22, 24 extends from the respective finger 18, 20 in a direction toward the vertical axis VA. In other words, the hooks 22, 24 are closer to the vertical axis VA than the fingers 18, 20.

Figure 4:
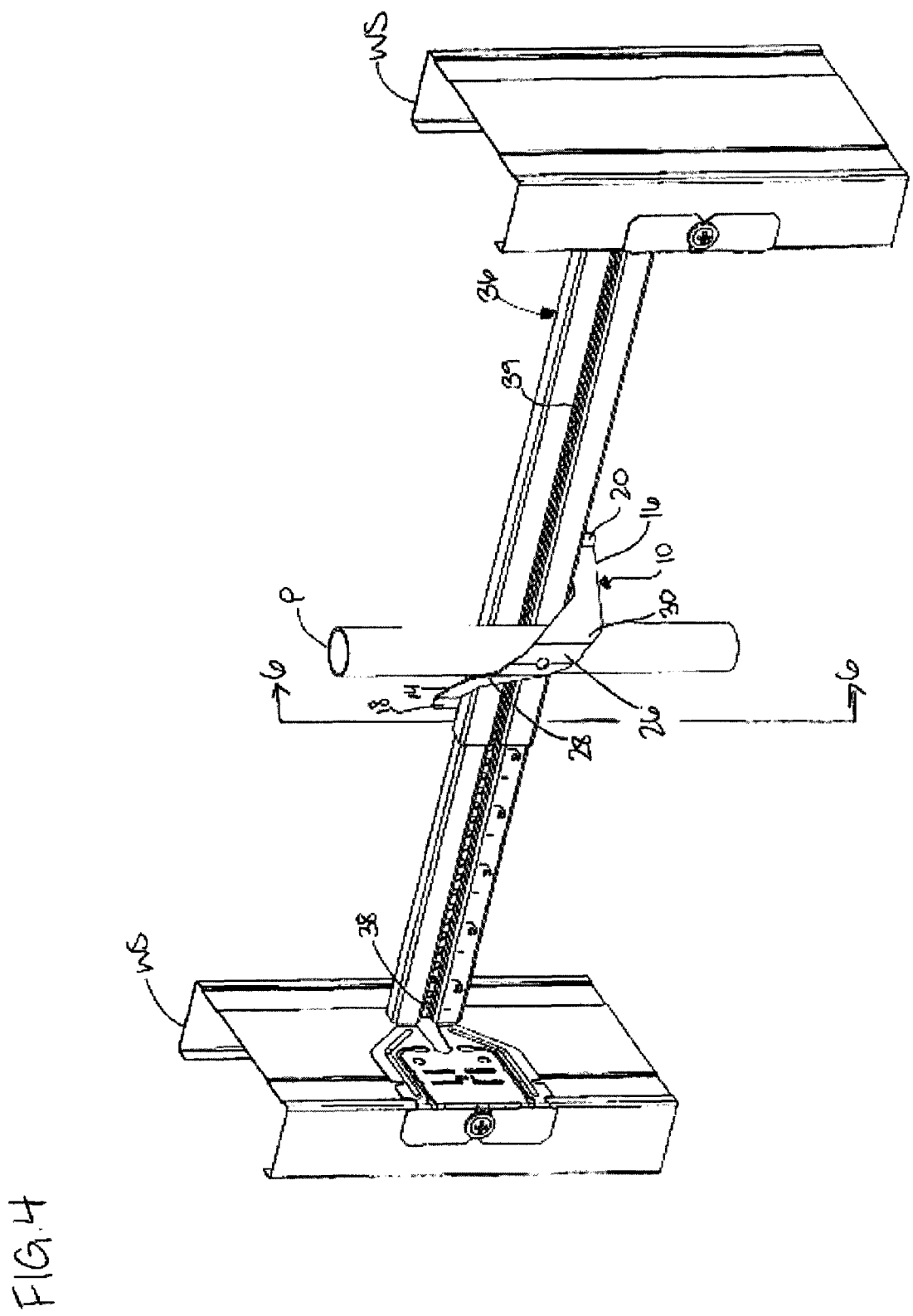
FIG. 4 is a perspective of a stud mounting bracket assembly including the stud mounting bracket and a pipe clamp mounting conduit to the stud mounting bracket.
Figure 5:
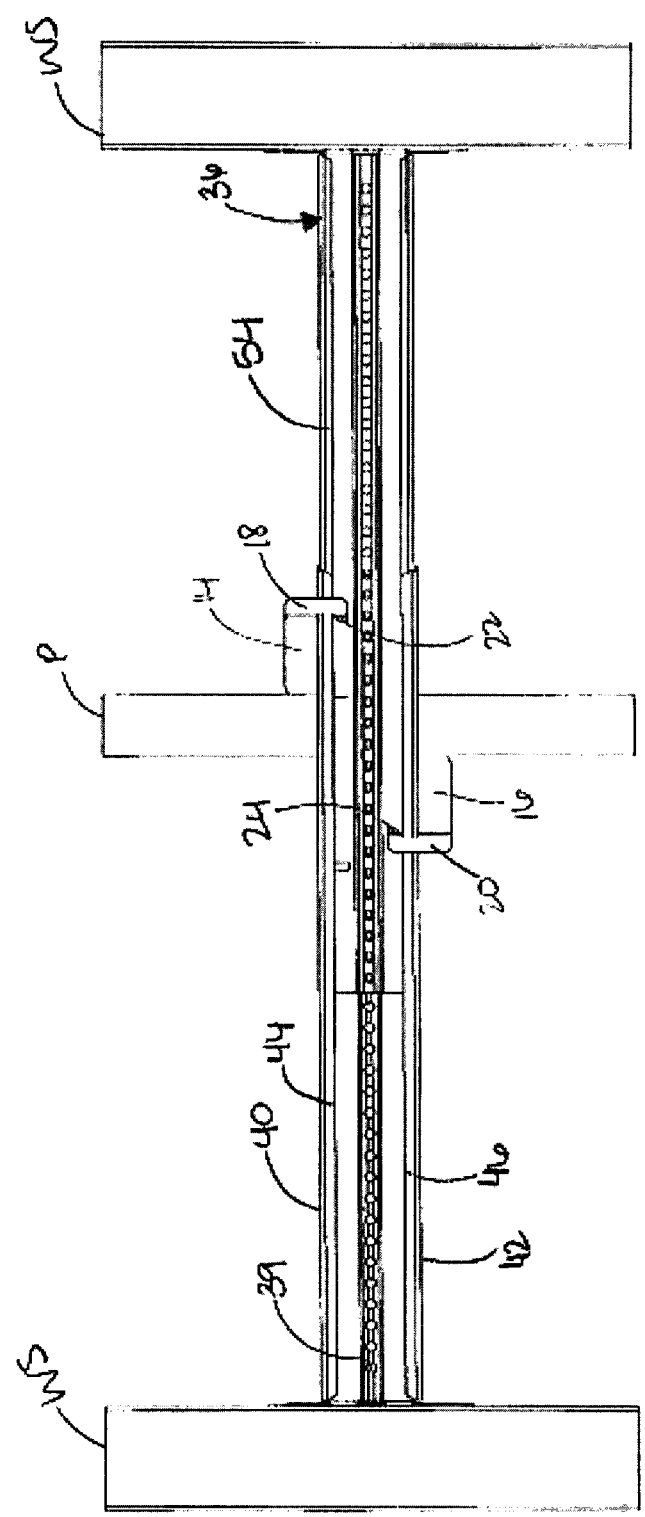
FIG. 5 is a rear elevation of the stud mounting bracket assembly of FIG. 4.
Figure 6:
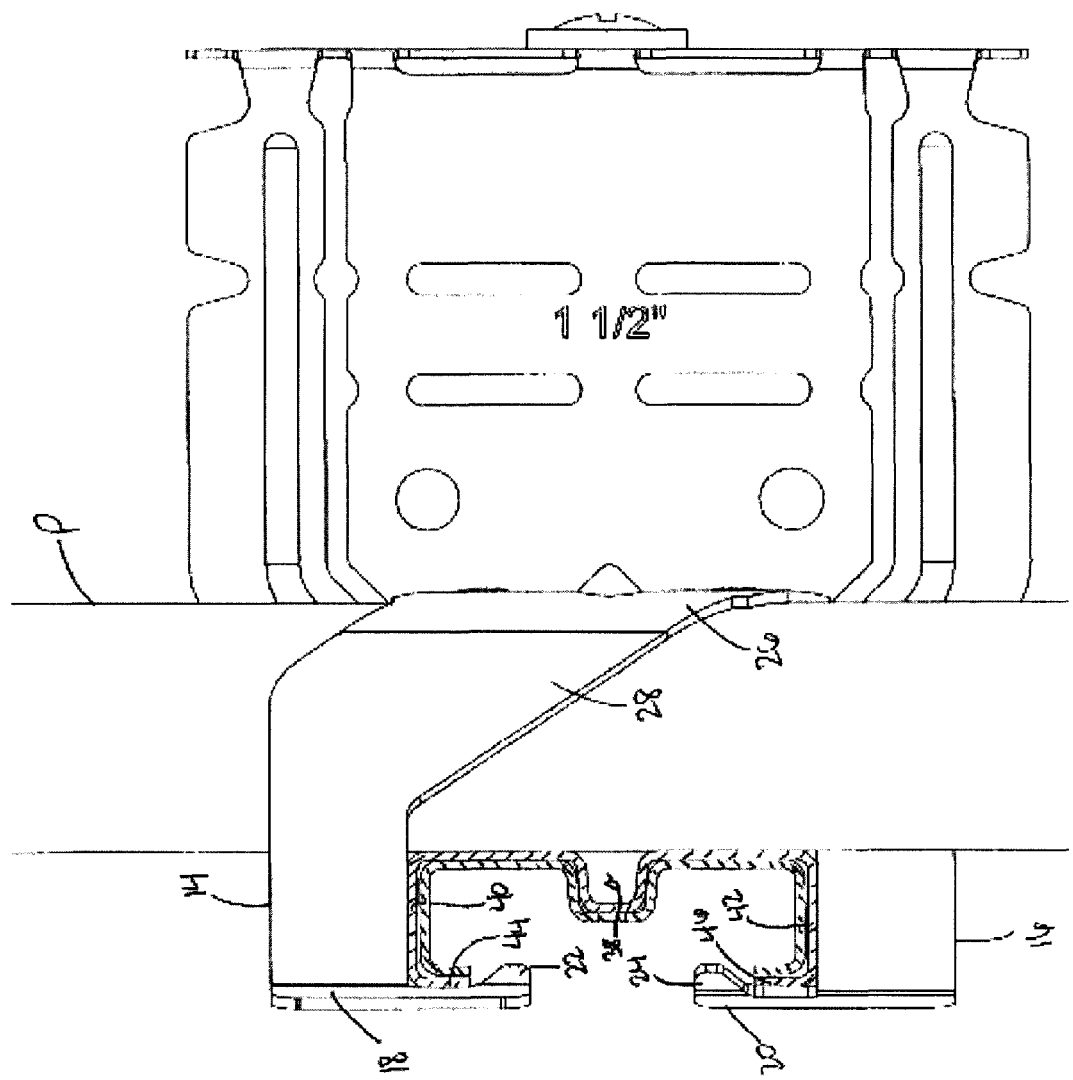
FIG. 6 is an enlarged section taken along line 6-6 of FIG. 4, illustrating the connection of the pipe clamp to the stud mounting bracket.
Figure 7:
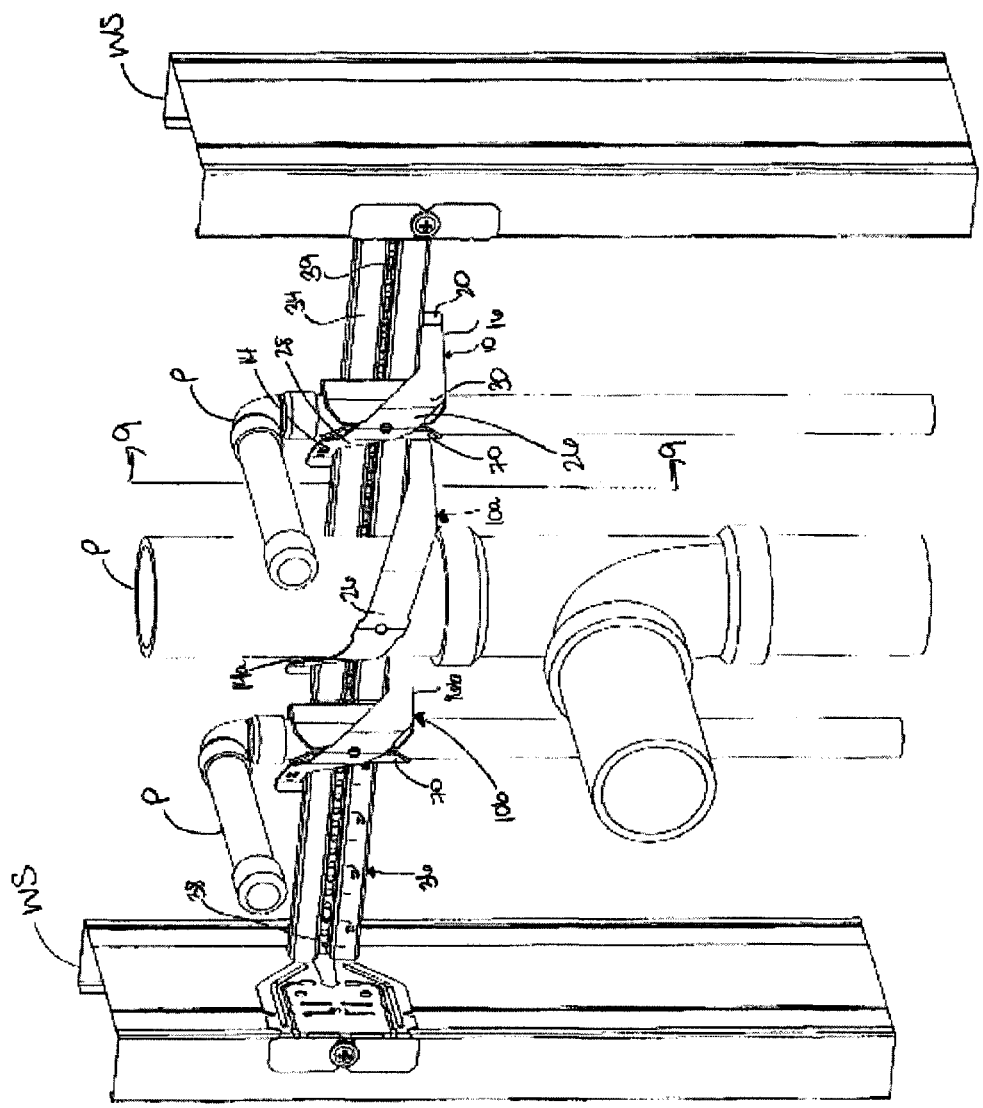
FIG. 7 is a perspective of a stud mounting bracket assembly including the stud mounting bracket, pipe clamps, tubing, and pipe sleeves.
Figure 8:
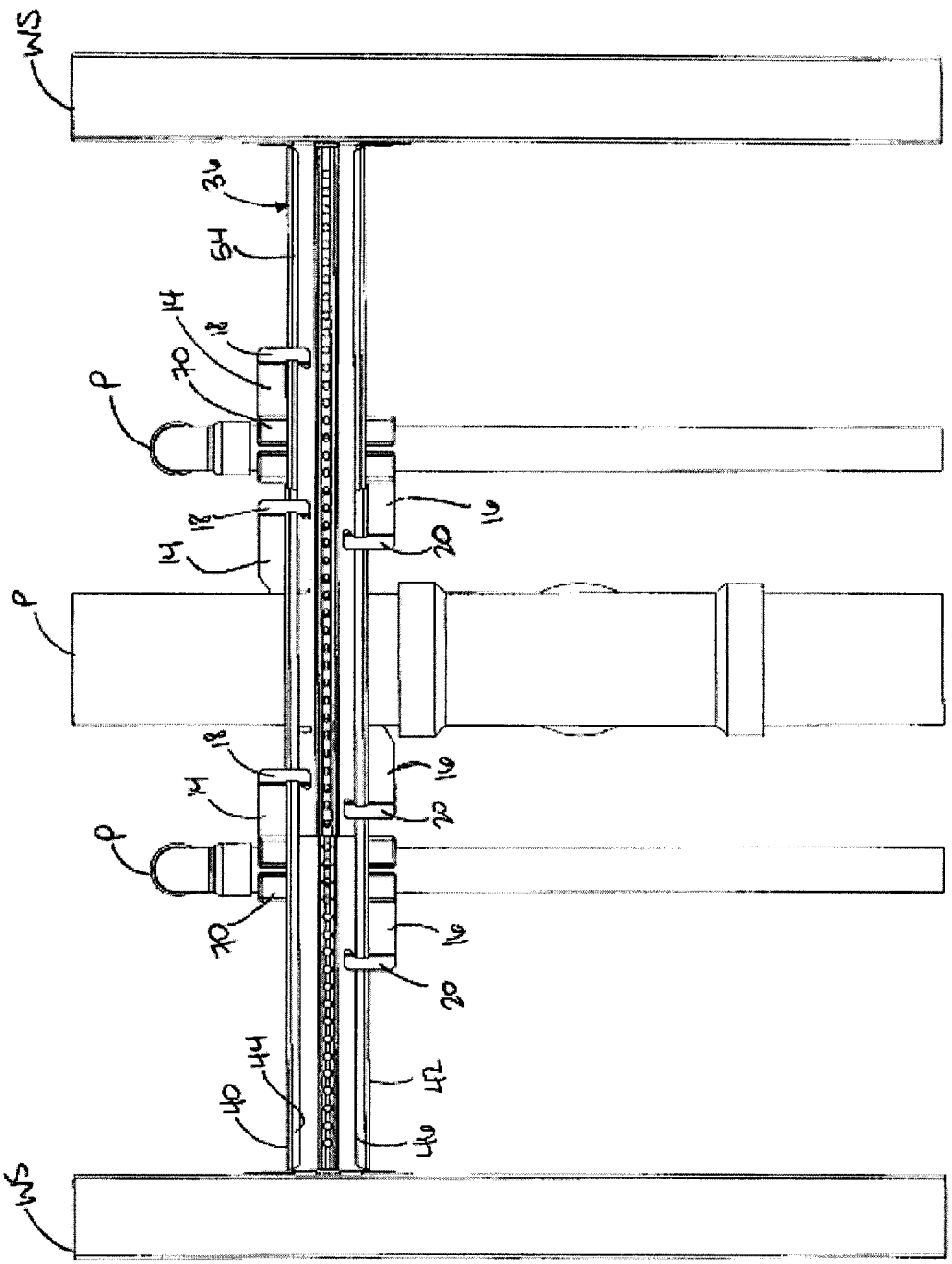
FIG. 8 is a rear elevation of the stud mounting bracket assembly of FIG. 7.
Figure 9:
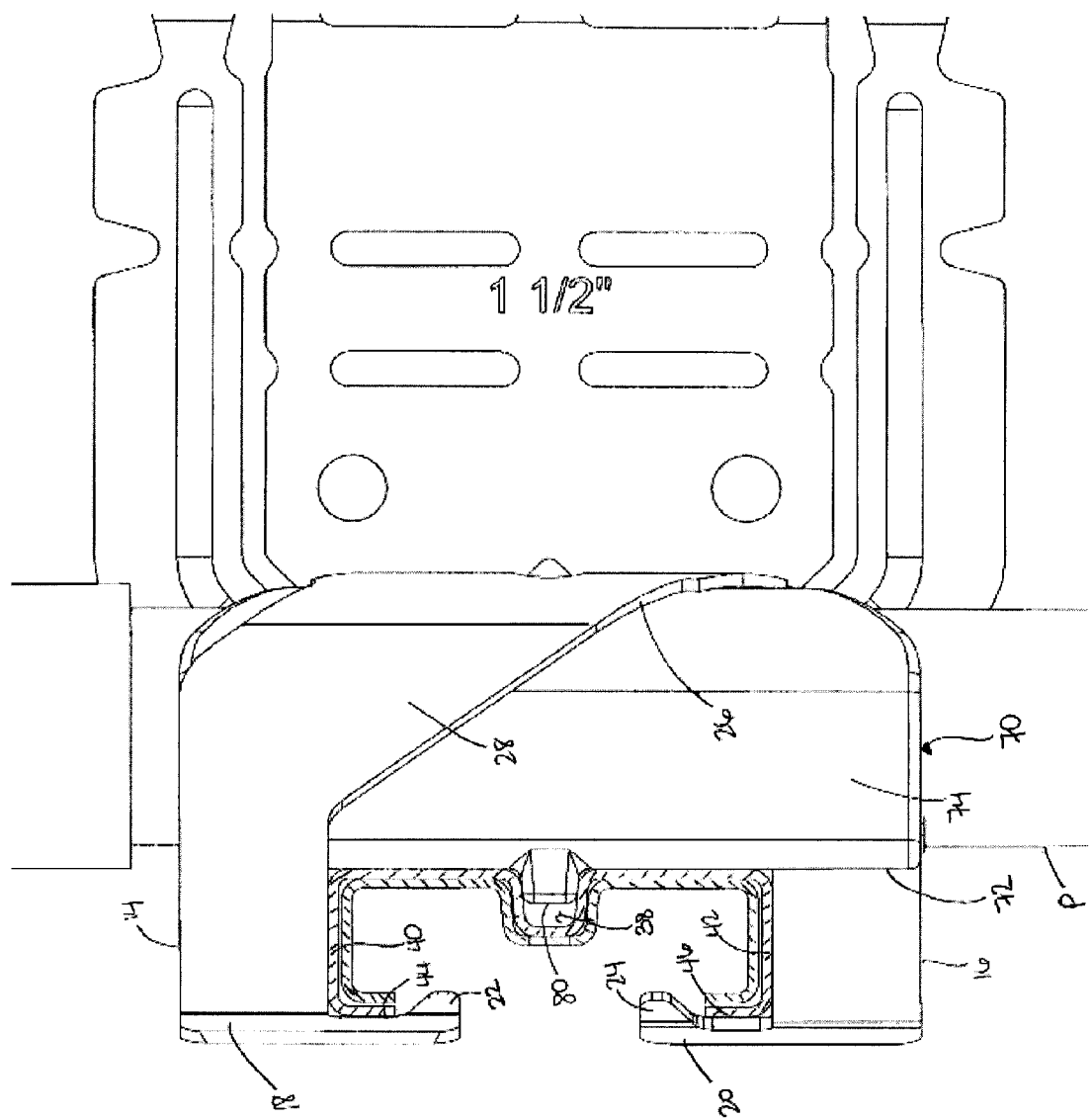
FIG. 9 is an enlarged section taken along line 9-9 of FIG. 7, illustrating the connection of the pipe clamp and the pipe sleeve to the stud mounting bracket.
Figure 10:
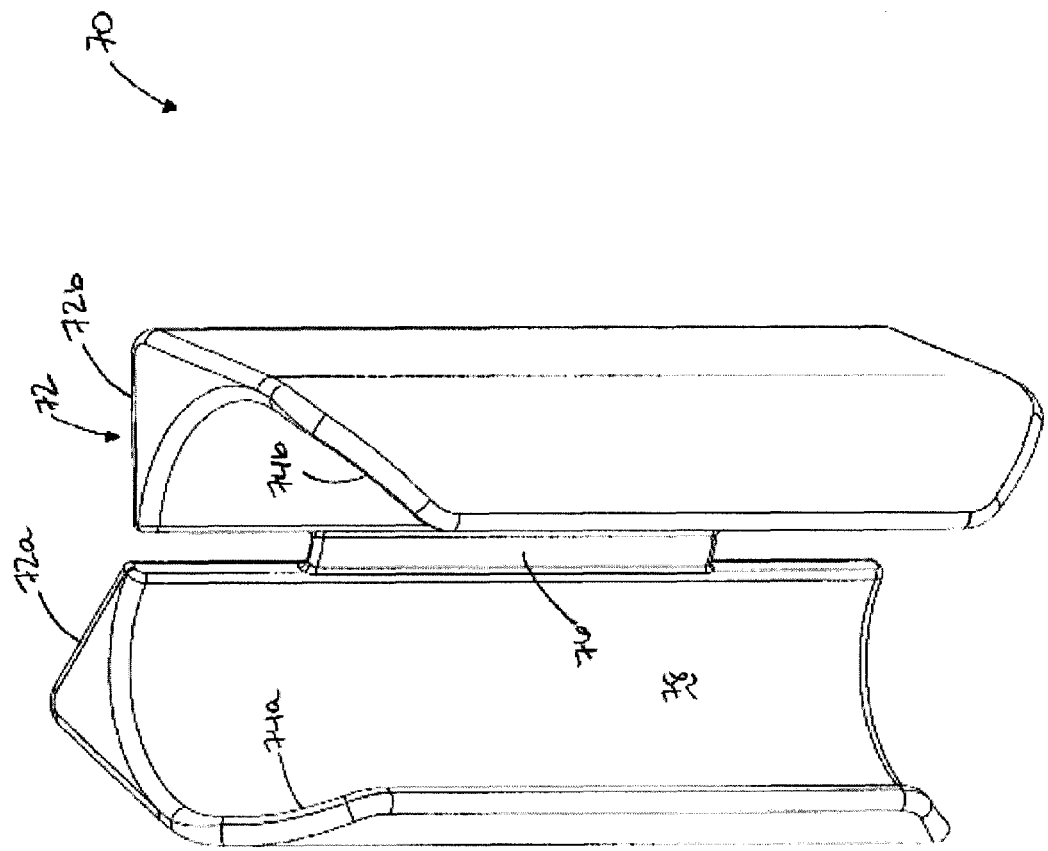
FIG. 10 is a perspective of a pipe sleeve for isolating a pipe from the pipe clamp and the stud mounting bracket, illustrating the pipe sleeve in an open configuration.

Referring now to FIGS. 4-9, the pipe clamp 10 is configured to mount a pipe P to a front face 34 of a stud mounting bracket 36 mounted to wall studs WS. FIGS. 4-6 illustrate the pipe clamp 10 mounting conduit (e.g., electrical metal tubing (EMT) conduit, rigid metal conduit, etc.) to the front face 34 of the stud mounting bracket 36. FIGS. 7-9 illustrate the pipe clamp 10 mounting tubing (e.g., copper tubing) to the front face 34 of the stud mounting bracket 36, with a pipe sleeve isolating the tubing as described below. In the illustrated embodiment, the stud mounting bracket 36 is a telescoping bracket, such as the bracket described in U.S. Ser. No. 14/811,278, filed Jul. 28, 2015, the entirety of which is incorporated herein by reference. The illustrated stud mounting bracket 36 includes a generally horizontal channel 38 extending along the length of the bracket. A plurality of pilot holes 39 are spaced along a bottom wall of the channel 38 and can be used to attach a junction box or other structure to the stud mounting bracket. A pair of upper and lower flanges 40, 42, respectively, extends generally horizontally rearward from respective upper and lower edge margins of the bracket 36. Lips (or return flanges) 44, 46 extend from the respective flanges 40, 42 generally toward each other. It is understood that the pipe clamp 10 can be used on stud mounting brackets having different configurations.

As seen in FIG. 6, the fingers 18, 20 engage the lips 44, 46 of the stud mounting bracket 36. The arm 14 extends over the upper flange 40, and the finger 18 extends downward from the arm to engage the lip 44. In the illustrated embodiment, an edge of the finger 18 between the hook 22 and the arm 14 engages (e.g., digs into) the lip 44. The hook 22 extends forward beneath the lip 44 to secure the pipe clamp 10 to the stud mounting bracket 36. Optionally, a shoulder between the hook 22 and the finger 18 can engage a lower margin of the lip 44 to retain the pipe clamp 10 on the stud mounting bracket 36. The arm 16 extends under the lower flange 42, and the finger 20 extends upward from the arm to engage the lip 46. In the illustrated embodiment, an edge of the finger 20 between the hook 24 and the arm 16 engages (e.g., digs into) the lip 46. The hook 24 extends forward above the lip 46 to secure the pipe clamp 10 to the stud mounting bracket 36. Optionally, a shoulder between the hook 24 and the finger 20 engages an upper margin of the lip 46 to retain the pipe clamp 10 on the stud mounting bracket 36.

As seen in FIGS. 4-6, the pipe engaging portion 26 engages the pipe P. The arms 14, 16 extend rearward above and below the respective upper and lower flanges 40, 42. The fingers 18, 20 extend downward and upward, respectively, behind a rear face 54 of the stud mounting bracket 36. The hooks 22, 24 extend forward in front of the lips 44, 46. The pipe clamp 10 thus extends from a position behind the stud mounting bracket 36 (e.g., at finger 18), to a position in front of the stud mounting bracket (e.g., at pipe engaging portion 26), to a position behind the stud mounting bracket (e.g., at finger 20). The pipe clamp 10 thereby secures the pipe P to the stud mounting bracket 36. The pipe clamp 10 engages a rear face 54 of the stud mounting bracket 36 to secure the pipe P to the front face 34 of the stud mounting bracket.

The angled main body 12 and the diagonally offset arms 14, 16, fingers 18, 20, and hooks 22, 24 of the pipe clamp 10 permit multiple pipes P to be attached to the stud mounting bracket 36 in close relation. As seen in FIG. 7, the arm 14a of a first clamp 10a can extend behind a pipe P secured to the stud mounting bracket 36 by a second clamp 10b, and the arm 16b of the second clamp 10b can extend behind a pipe P secured to the bracket by the first clamp 10a. Moreover, as seen in FIG. 8, the fingers 18, 20 and arms 14, 16 of adjacent pipe clamps 10a, 10b can overlap vertically along the length of the bracket 36. The pipe clamp 10 facilitates close spacing of pipes, thereby permitting more pipes to be secured to the stud mounting bracket 36. In addition, the pipe clamp 10 resiliently clips onto the stud mounting bracket 36 without requiring any fasteners to attach the clamp to the bracket. The clamp 10 can easily be placed in position by a user, either with or without a tool. The clamp 10 can be positioned at any location along the stud mounting bracket 36 and easily moved because no fasteners are necessary to attach the clamp.

Referring to FIGS. 10-13, a pipe sleeve for isolating the pipe P from the pipe clamp 10 and the stud mounting bracket 36 is generally indicated at 70. The pipe sleeve 70 can be used with the pipe clamp 10 to prevent galvanic corrosion due to contact of the pipe P and the pipe clamp. The pipe sleeve 70 can also be used with other pipe clamps to prevent galvanic corrosion due to contact of the pipe P and the stud mounting bracket 36. In particular, the pipe sleeve 70 is suitable for use when mounting copper tubing to the stud mounting bracket 36 using the pipe clamp 10. In the illustrated embodiment, the pipe sleeve 70 is formed as a unitary structure. The pipe sleeve 70 can be formed from plastic, such as nylon 66, or other material suitable to isolate components of different metals.

The pipe sleeve 70 includes a bracket engaging portion 72 and a pipe engaging portion 74. The bracket engaging portion 72 is generally planar. The bracket engaging portion 72 is configured to engage the front face 34 of the stud mounting bracket 36. The pipe engaging portion 74 is arcuate and generally conforms to a circumferential portion of the pipe P received in the pipe sleeve 70. Thus, the pipe sleeve 70 has a generally planar portion configured to engage a stud mounting bracket 36 and a generally arcuate portion configured to engage a pipe P. It is understood that other configurations are within the scope of the present invention, such as the engaging portions having geometries different than those illustrated.

Figure 11:
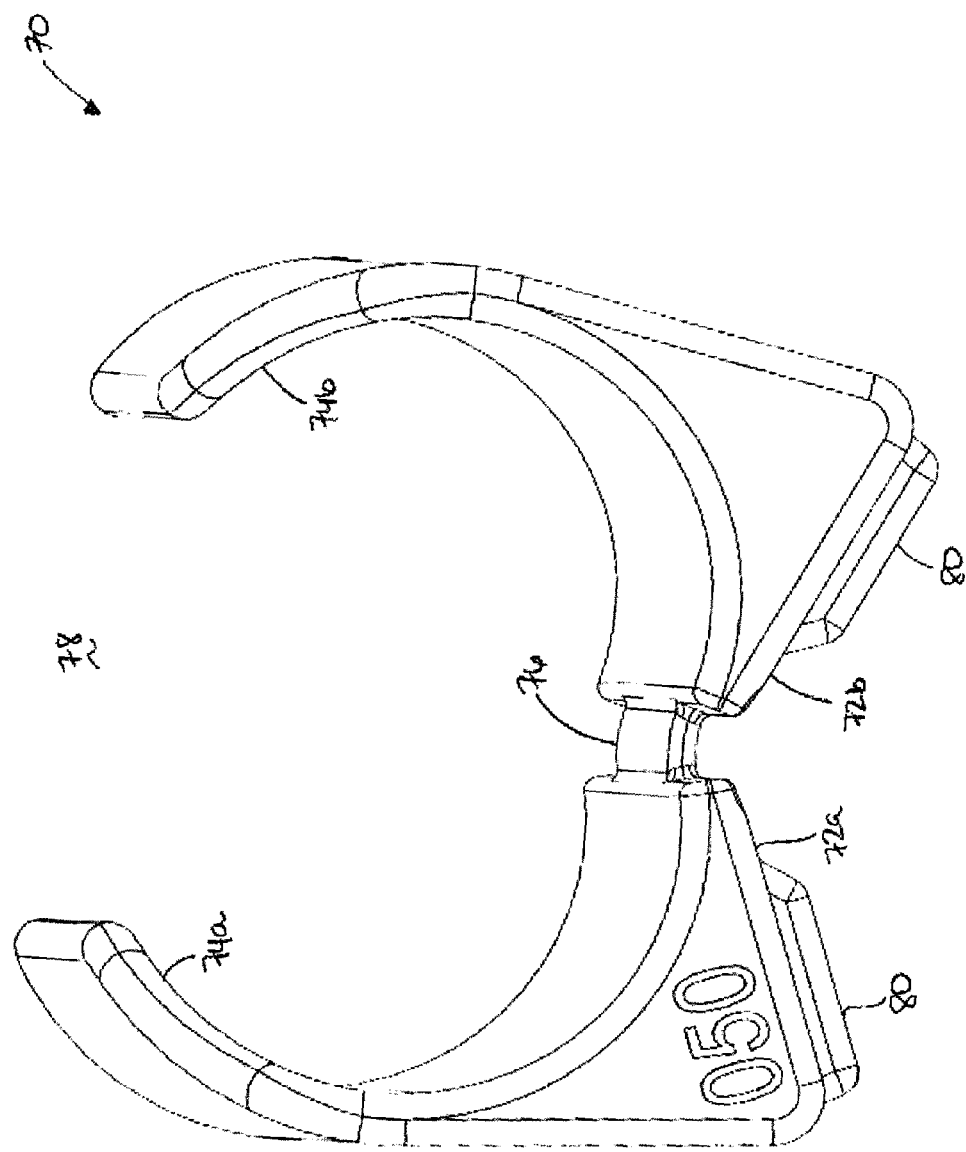
FIG. 11 is a bottom plan of the pipe sleeve of FIG. 10.
Figure 12:
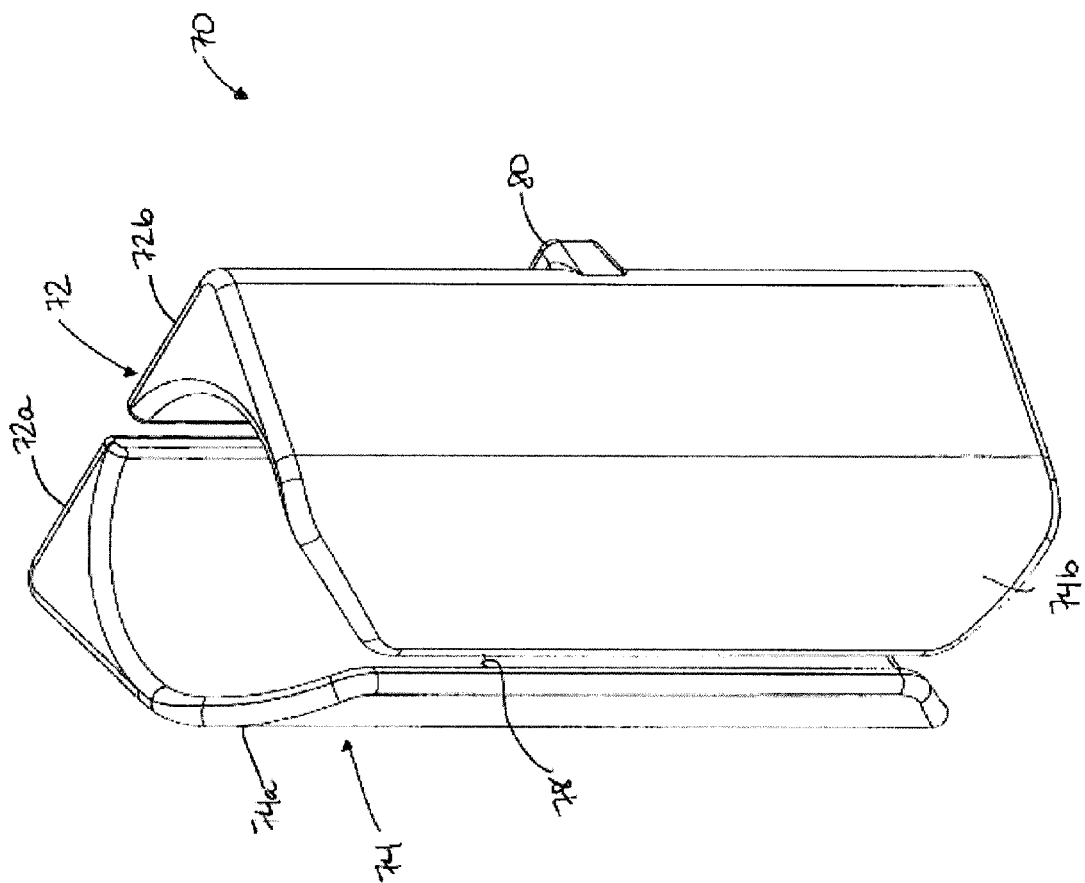
FIG. 12 is a perspective of the pipe sleeve of FIG. 10, illustrating the pipe sleeve in a closed configuration.
Figure 13:
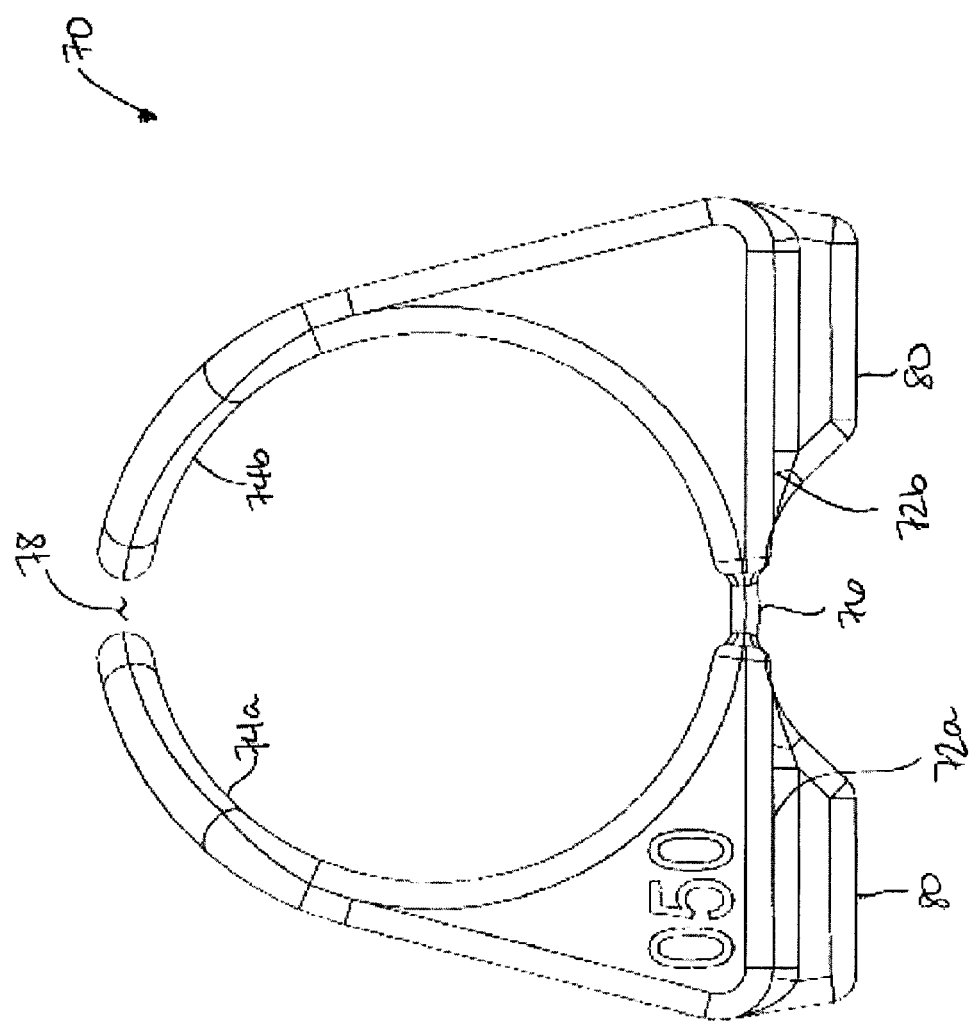
FIG. 13 is a bottom plan of the pipe sleeve of FIG. 12.

In the illustrated embodiment, the pipe sleeve 70 comprises first and second bracket engaging portions 72a, 72b. The first and second bracket engaging portions 72a, 72b are attached to each other, such as by a living hinge 76. The pipe sleeve 70 includes first and second pipe engaging portions 74a, 74b extending from the respective first and second bracket engaging portions 72a, 72b. A slot 78 extends along a length of the pipe sleeve 70 between the first and second pipe engaging portions 74a, 74b. The hinge 76 permits movement of the first engaging portions 72a, 74a relative to the second engaging portions 72b, 74b between an open position, thereby permitting insertion of a pipe P into the sleeve 70 through the slot 78, and a closed position, whereby the first and second pipe engaging portions snugly grip the pipe. In one embodiment, the slot 78 is present in both the open and closed positions. As an example, the slot 78 may have a width of about ⅛ inch when the pipe sleeve 70 is in the closed position, to allow for pipes of slightly different outer diameters to be used with the same pipe sleeve. In one embodiment, the pipe sleeve 70 is biased to an initial open configuration, as shown in FIG. 11, for example. In the initial open configuration, the slot 78 has a width that is less than an outer diameter of the corresponding pipe P and greater than the width of the slot when the pipe sleeve 70 is in the closed configuration. The width of the slot 78 in the initial open configuration allows flexing of the first engaging portions 72a, 74a relative to the second engaging portions 72b, 74b relative to each other to widen the slot as the pipe P enters the slot 78. After entering the sleeve 70 through the slot 78, the pipe sleeve 70 rebounds to the initial open configuration, whereby the width of the slot is less than the outer diameter of the pipe P to restrict withdrawal of the pipe through the slot. Preferably, the pipe sleeve 70 is sold in the open configuration shown in FIGS. 10 and 11. Engagement of the bracket engaging portions 72a, 72b with the front face 38 of the bracket 36 urges the sleeve 70 to remain in the closed position shown in FIGS. 12 and 13 to secure to the pipe P.

The pipe sleeve 70 includes positioning projections 80 on the bracket engaging portion 72. The projections 80 extend rearward from the planar bracket engaging portion 72. The projections 80 are generally centrally located along a length of the pipe sleeve 70. The projections 80 are configured to be received in the channel 38 of the stud mounting bracket 36 to position the sleeve 70 on the stud mounting bracket 36.

Referring to FIGS. 7-9, the pipe sleeve 70 isolates the pipe P from both the stud mounting bracket 36 and the pipe clamp 10. The bracket engaging portion 72 engages the front face 34 of the stud mounting bracket 36 and is positioned between the pipe P and the stud mounting bracket. The pipe engaging portion 74 receives the pipe P and is positioned between the pipe and the pipe clamp 10. Thus, the pipe P does not directly contact either the stud mounting bracket 36 or the pipe clamp 10. The projections 80 are positioned in the channel 38 to locate the sleeve 70 on the bracket 36.

Figure 14:
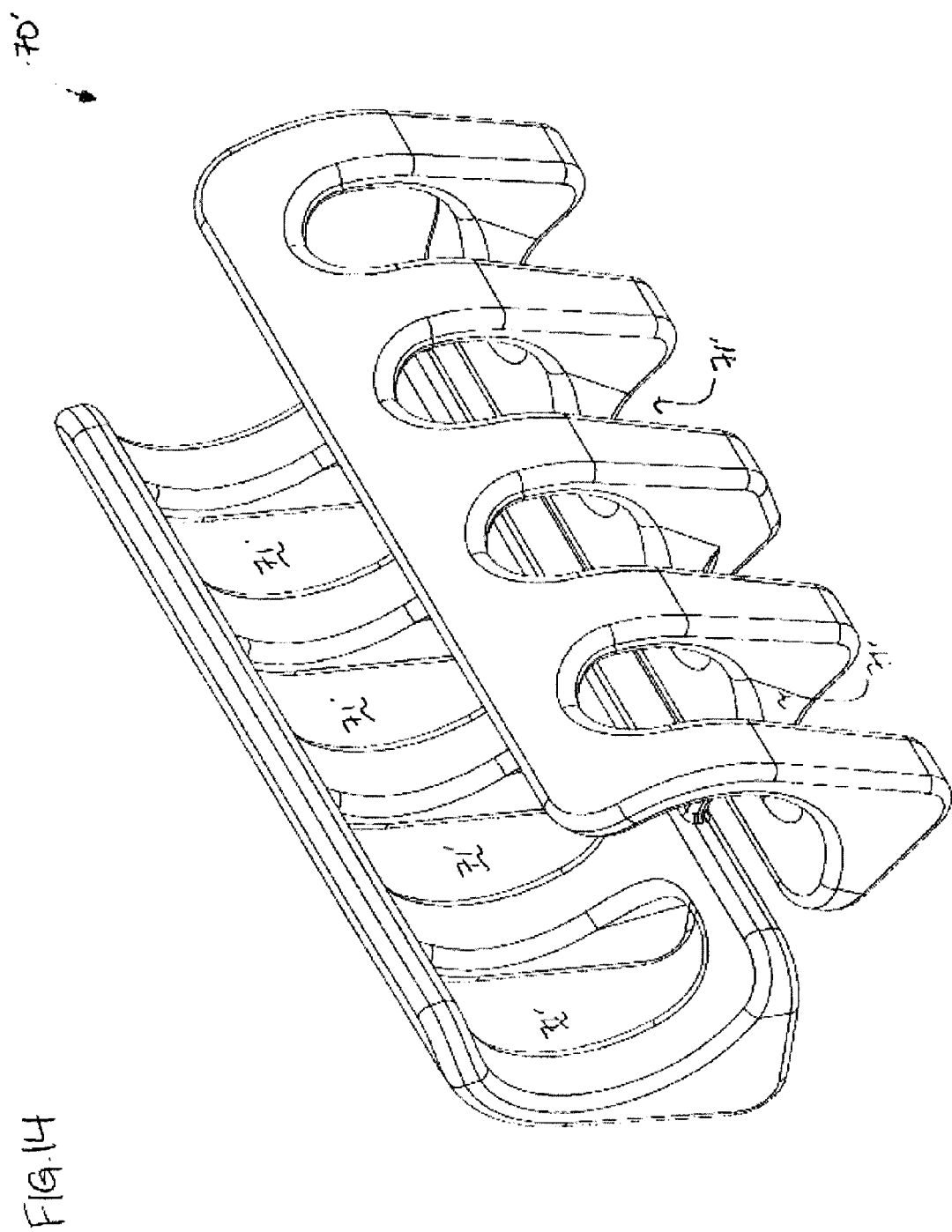
FIG. 14 is a perspective of an another embodiment of a pipe sleeve for isolating a pipe from the pipe clamp and the stud mounting bracket.
Figure 15:
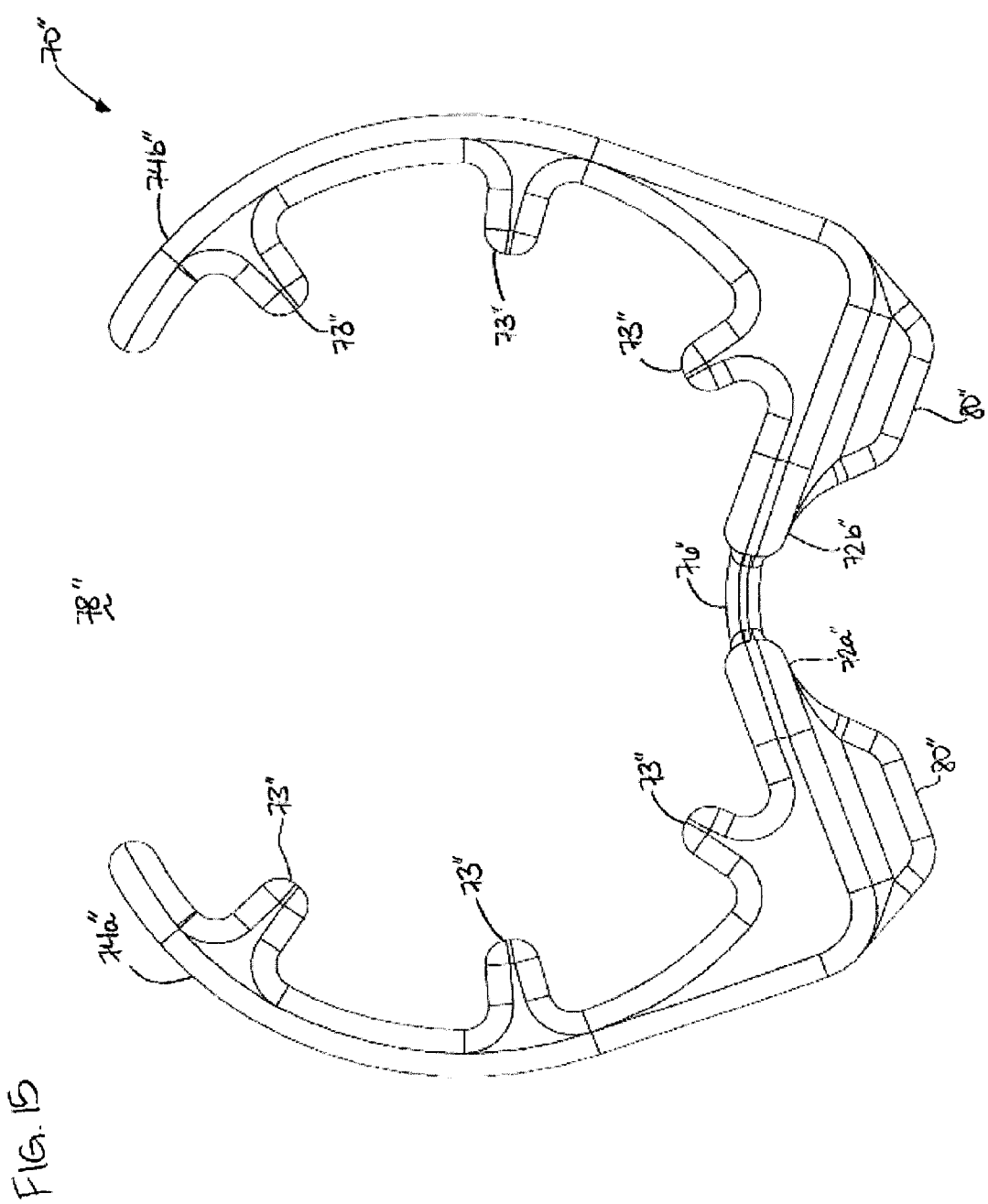
FIG. 15 is a bottom plan of another embodiment of a pipe sleeve for isolating a pipe from the pipe clamp and the stud mounting bracket.

FIGS. 14-16 illustrate alternate embodiments of pipe sleeves for use in isolating a pipe P. In FIG. 14, the pipe sleeve 70' includes cutouts 71' to reduce the material requirement for the pipe sleeve. In FIG. 15, the pipe engaging portions 74a'', 74b'' of the pipe sleeve 70'' include projections or fins 73'' configured to engage a pipe P. In FIG. 16, the projections 80''' of the pipe sleeve 70''' are positioned adjacent opposite ends of the pipe sleeve. The projections 80''' are configured to engage the upper and lower flanges 40, 42 of the stud mounting bracket 36 to position the sleeve 70''' on the stud mounting bracket.

Referring to FIGS. 17 and 18, a locator bracket for use in a prefabricated assembly including the pipe clamp 10 is generally indicated at 90. The locator bracket 90 includes a front face 92 and a rear face 94. A plurality of generally horizontal slots 96 are generally centrally located between upper and lower margins of the locator bracket 90. An upper flange 98 extends generally horizontally rearward from the upper edge margin and a lip (or return flange) 100 extends generally downward from an end of the upper flange. The upper flange 98 extends along portions of the upper margin of the locator bracket 90 spaced by relieved areas or recesses 102. Fastener openings 104 extend through the locator bracket 90 at both ends thereof. A strap locator 106 including generally vertical slots 108 is generally centrally located between the upper and lower edge margins of the locator bracket 90.

Referring to FIGS. 17 and 18, the locator bracket 90 is configured for positioning on the stud mounting bracket 36. When the locator bracket 90 is positioned on the stud mounting bracket 36, the upper flange 98 and lip 100 of the locator bracket engage and overlie the upper flange 40 and lip 44 of the stud mounting bracket. The horizontal slots 96 of the locator bracket overlie the channel 38 of the stud mounting bracket and permit access to the channel and the pilot holes 39.

The locator bracket 90 is configured for use in a prefabricated assembly for attachment to the stud mounting bracket 36. The strap locator 106 receives a strap 110 to mount a pipe (e.g., a stack pipe S) to the locator bracket 90. The assembled stack S and locator bracket 90 can then be correctly positioned on the stud mounting bracket 36 by placing the upper flange 98 and lip 100 of the locator bracket over the upper flange 40 and lip 44 of the stud mounting bracket. The locator bracket 90 is fastened to the stud mounting bracket 36 by fasteners F extending through the fastener openings 104 and through one of the pilot holes 39 in the channel 38 of the stud mounting bracket. Upon attachment of the locator bracket 90 and the stack S to the stud mounting bracket 36, pipes P can be secured to the stud mounting bracket with pipe clamps 10. If necessary, the pipes P can be isolated from the locator bracket 90 and the pipe clamp 10 by pipe sleeves 70. The projections 80 on the sleeve 70 extend through the slots 96 to be received in the channel 38. The recesses 102 permit the pipe clamp 10 to engage the stud mounting bracket 36, thereby securing the pipe P to the stud mounting bracket and the locator bracket 90.

The pipe clamp 10 can be sold and shipped to customers separately or as part of an assembly, such as a prefabricated assembly, or as part of a kit. Likewise, the pipe sleeve 70 can be sold and shipped to customers separately or as part of an assembly, such as a prefabricated assembly, or as part of a kit. The locator bracket 90 can be sold and shipped to customers separately or as part of an assembly, such as a prefabricated assembly, or as part of a kit. In one embodiment, the pipe clamp 10 can be sold with the pipe sleeve 70 as a kit for assembly by the user. Optionally, the kit can include a stud mounting bracket 36, pipe P, or both. In one embodiment, a prefabricated assembly includes a locator bracket 90 having a stack S attached thereto. Optionally, the prefabricated assembly can include a stud mounting bracket 36, one or more pipes P, one or more pipe clamps 10, one or more pipe sleeves 70, or any combination thereof. Other configurations, assemblies, and kits are within the scope of the present invention.

Having described embodiments of the invention in detail, it will be apparent that modifications and variations are possible without departing from the scope of the invention defined in the appended claims.

When introducing elements of the illustrated embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A pipe clamp for mounting a pipe on a stud mounting bracket, the pipe clamp comprising:
   a main body having a central portion for mounting on the pipe having opposite first and second ends, and opposite first and second transition portions at the first and second ends, respectively, the main body having a horizontal axis extending through a center of the main body and a vertical axis extending through the center of the main body, wherein the first and second transition portions are positioned on opposite sides of the horizontal axis and on opposite sides of the vertical axis;
   a first arm extending from the first transition portion in a direction away from the vertical axis;
   a second arm extending from the second transition portion in a direction away from the vertical axis;
   a first finger extending from the first arm in a direction toward the horizontal axis;
   a second finger extending from the second arm in a direction toward the horizontal axis;
   a first hook extending from the first finger in a direction toward the vertical axis; and
   a second hook extending from the second finger in a direction toward the vertical axis,
   wherein the first hook is configured to hook into an upper portion of the stud mounting bracket and the second hook is configured to hook onto a lower portion of the stud mounting bracket opposite the upper portion so that the vertical axis of the main body extends along a length of the pipe, the horizontal axis of the main body extends generally transverse to the length of the pipe, and the first arm, the main body and the second arm together extend generally diagonally relative to the length of the pipe to clamp the pipe on the stud mounting bracket.

2. The pipe clamp as recited in claim 1, wherein the first and second hooks extend from the respective first and second fingers at an angle.

3. The pipe clamp as recited in claim 2, wherein the first and second hooks extend from the respective first and second fingers at an angle of about 145°.

4. The pipe clamp as recited in claim 1, wherein the first and second fingers extend from the respective first and second arms at an angle.

5. The pipe clamp as recited in claim 1, wherein the first and second fingers extend from the respective first and second arms at an angle of about 145°.

6. The pipe clamp as recited in claim 1, wherein the central portion is generally arcuate and the first and second transition portions are generally planar.

7. The pipe clamp as recited in claim 6, wherein the first arm is generally co-planar with the first transition portion and the second arm is generally co-planar with the second transition portion.

8. A method of mounting a pipe on a stud mounting bracket, the method comprising:
   providing a pipe clamp, wherein the pipe clamp comprises:
      a main body having a central portion for mounting on the pipe and opposite first and second transition portions, the main body having a horizontal axis extending through a center of the main body and a vertical axis extending through the center of the main body, wherein the first and second transition portions are positioned on opposite sides of the horizontal axis and on opposite sides of the vertical axis;
      a first arm extending from the first transition portion in a direction away from the vertical axis;
      a second arm extending from the second transition portion in a direction away from the vertical axis;
      a first finger extending from the first arm in a direction toward the horizontal axis;
      a second finger extending from the second arm in a direction toward the horizontal axis;
      a first hook extending from the first finger in a direction toward the vertical axis; and
      a second hook extending from the second finger in a direction toward the vertical axis;
   positioning a pipe vertically at a front face of a stud mounting bracket; and
   hooking the first hook of the pipe clamp onto an upper portion of the stud mounting bracket and hooking the second hook of the pipe clamp onto a lower portion of the stud mounting bracket so that the pipe is disposed between the front face of the stud mounting bracket and the central portion for mounting on the pipe and so that the first arm, the main body and the second arm together extend generally diagonally relative to the length of the pipe, wherein the vertical axis of the main body extends along the length of the pipe, and the horizontal axis of the main body extends generally transverse to the length of the pipe.

9. The method of mounting a pipe on a stud mounting bracket as set forth in claim 8, wherein said hooking the pipe clamp comprises hooking the pipe clamp onto upper and lower flanges of the upper and lower portions of the stud mounting bracket.

\* \* \* \* \*